US007921072B2

(12) United States Patent
Bohannon et al.

(10) Patent No.: US 7,921,072 B2
(45) Date of Patent: Apr. 5, 2011

(54) METHODS AND APPARATUS FOR MAPPING SOURCE SCHEMAS TO A TARGET SCHEMA USING SCHEMA EMBEDDING

(75) Inventors: Philip L. Bohannon, Bridgewater, NJ (US); Wenfei Fan, Somerset, NJ (US); Michael E. Flaster, Tenafly, NJ (US); Suryanarayan Perinkulam, Clinton, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 502 days.

(21) Appl. No.: 11/141,357

(22) Filed: May 31, 2005

(65) Prior Publication Data

US 2006/0271506 A1    Nov. 30, 2006

(51) Int. Cl.
*G06F 7/00* (2006.01)
*G06F 17/00* (2006.01)
(52) U.S. Cl. ........ 707/601; 707/602; 707/603; 707/604; 706/45; 706/46; 706/61
(58) Field of Classification Search ........ 707/100–104.1
See application file for complete search history.

(56) References Cited

U.S. PATENT DOCUMENTS

| | | | |
|---|---|---|---|
| 6,499,023 B1 * | 12/2002 | Dong et al. ........ | 706/46 |
| 6,704,747 B1 * | 3/2004 | Fong ........ | 707/104.1 |
| 6,785,673 B1 * | 8/2004 | Fernandez et al. ........ | 707/3 |
| 7,055,098 B2 * | 5/2006 | Hull et al. ........ | 715/530 |
| 7,099,885 B2 * | 8/2006 | Hellman et al. ........ | 707/103 R |
| 7,496,571 B2 * | 2/2009 | Benedikt et al. ........ | 707/6 |
| 2003/0130855 A1 * | 7/2003 | Babu et al. ........ | 704/500 |
| 2003/0149934 A1 * | 8/2003 | Worden ........ | 715/513 |
| 2003/0163597 A1 * | 8/2003 | Hellman et al. ........ | 709/316 |
| 2003/0217069 A1 * | 11/2003 | Fagin et al. ........ | 707/102 |
| 2004/0064456 A1 * | 4/2004 | Fong et al. ........ | 707/100 |
| 2004/0111410 A1 * | 6/2004 | Burgoon et al. ........ | 707/4 |
| 2004/0148278 A1 * | 7/2004 | Milo et al. ........ | 707/3 |
| 2004/0199905 A1 * | 10/2004 | Fagin et al. ........ | 717/136 |
| 2004/0220954 A1 * | 11/2004 | Zhou et al. ........ | 707/101 |

(Continued)

OTHER PUBLICATIONS

Do et al., "COMA—a System for Flexible Combination of Schema Matching Approaches," Proceedings of the 28th VLDB Conference, Hong Kong, China (2002).
Hamkimpour et al., "Resolving Semantic Heterogeneity in Schema Integration: an Ontology Based Approach," FOIS'01, Ogunquit, Maine, pp. 17-19 (2001).
Rahm et al., "Matching Large XML Schemas," SIGMOD Record 33(4), pp. 26-31 (2004).

(Continued)

*Primary Examiner* — Jean M Corrielus
*Assistant Examiner* — Angelica Ruiz
(74) *Attorney, Agent, or Firm* — Ryan, Mason & Lewis, LLP

(57) ABSTRACT

Methods and apparatus are provided for mapping XML source documents to target documents using schema embeddings. According to one aspect of the invention, one or more edges in the one or more source schemas are mapped to one or more paths in at least one target schema. The disclosed mapping techniques ensure that (i) one or more source documents that conform to one or more of the source schemas can be recovered from one or more target documents that conform to the at least one target schema, if a mapping exists between the one or more of the source schemas and the at least one target schema; (ii) queries on one or more source documents that conform to one or more of the source schemas in a given query language can be answered on one or more target documents that conform to the at least one target schema; and (iii) the one or more target documents conform to a target schema.

23 Claims, 7 Drawing Sheets

U.S. PATENT DOCUMENTS

| | | |
|---|---|---|
| 2005/0235236 A1* | 10/2005 | Sharma et al. .................... 716/7 |
| 2005/0256818 A1* | 11/2005 | Sun et al. ........................ 706/46 |
| 2006/0136428 A1* | 6/2006 | Syeda-Mahmood ......... 707/100 |
| 2006/0136435 A1* | 6/2006 | Nguyen et al. ................ 707/100 |
| 2006/0136463 A1* | 6/2006 | Nash et al. .................... 707/102 |
| 2006/0173865 A1* | 8/2006 | Fong ............................. 707/100 |
| 2006/0212860 A1* | 9/2006 | Benedikt et al. .............. 717/144 |

OTHER PUBLICATIONS

Melnik et al., "Similarity Flooding: A Versatile Graph Matching Algorithm and its Application to Schema Matching," ICDE, pp. 117-128 (2002).

* cited by examiner

FIG. 3

Algorithm findPathsDAG $(G, s, L_{tar})$

Input: Directed Acyclic Graph $G$, source node $s$,
a bag of target nodes $L_{tar} = \{|t_1,..., t_k|\}$.
Output: Paths $p_1,...,p_k$ satisfying the prefix-free condition.

1. path $p := $ <empty>;
2. $P = \emptyset$;
3. marked $(n) := $ false for all $n$ ;
4. traverse $(G, s, p, L_{tar}, P)$;
5. if $L_{tar}$ is nonempty
6.     return $\emptyset$;
7. else return $P$;

FIG. 4

Algorithm traverse $(G, n, p, L_{tar}, P)$

Input: Directed Acyclic Graph $G$, node $n$,
a bag of target nodes $L_{tar} = \{|t_1,...,t_k|\}$,
$p$, the current path to the root
and $P$ the output set of prefix-free paths
Global variables: marked: maps nodes to {true,false}
Output: a list of paths 1. if (marked (n)) return false;
2. if $(n \in L_{tar})$
3.     remove $n$ from $L_{tar}$;
4.     add $p$ to $P$
5.     return true;
6. else ret = false;
7.     for each edge $e = (n, m)$ outgoing from $n$
8.         append $e$ to $p$;
9.         ret := ret or traverse $(G, m, p, L_{tar}, P)$;
10.        remove $e$ from $p$;
11.     if (not ret) marked $(n):=$true;
12. return ret;

FIG. 5

Algorithm Ordered $(S_1, S_2, O, C)$

Input: Schemas $S_1$ and $S_2$, an ordered set of source tags $O$, and $C$, a set of local embeddings for each source tag.
Output: a schema embedding from $S_1$ to $S_2$ if one is found.

1.    $\sigma$ := empty solution $(\emptyset, \emptyset)$;
2.    for $A$ in $O$
3.        for $\sigma_A$ in $C(A)$
4.            $c$ := conflict between $\sigma$ and $\sigma_A$
5.            if $c$ is null
6.               $\sigma = \sigma \oplus \sigma_A$; break;
7.        if $c$ is not null
8.            findPathsRand $(G, A, L_{tar}(A)-c)$;
9.    if $c$ is not null return $\emptyset$;
10.   return $\sigma$;

FIG. 6

Algorithm QualityOrdered $(S_1, S_2)$

Input: Schemas $S_1$ and $S_2$.
Output: a schema embedding from $S_1$ to $S_2$ if one is found.

1. count := 0;
2. while (count <MAX_TRIES) do
3.    count ++;
4.    for each source node $A$
5.       $C(A)$ := {a local embedding, $\sigma_A$ for $A$ as found by findPathsRand };
6.    $O$ := All source nodes, ordered by qual$(\sigma_A,$ att);
7.    $\sigma$ := Ordered $(S_1, S_2, O, C)$;
8.    if $\sigma \neq \emptyset$
9.       return $\sigma$;
10. return $\emptyset$;

Alogrithm findpaths ($G$, $s$, $L_{tar}$)

Input: Directed graph $G$, source node $s$,
a bag of target nodes $L_{tar} = \{|t_1,...,t_k|\}$.
Output: Paths $p_1,...,p_k$ satisfying the prefix-free condition,
or "no" if such paths do not exist.

1. Let $G_T$ be the subgraph of $G$ reachable from $s$
2.    if any $t_i$ is not in $G_T$ return "no";
3. Let $G_c$ be the component graph of $G_T$;/* see text */
4. Let $C$ be the subset of the components $c_i$ in $G_c$
    with a nonempty target shadow; /* see text */
5. Let $L'_{tar}$ be the subset of $L_{tar}$ not in the shadow of any $c_i$;
6. Add each $c_i$ with a nonempty target shadow to $L'_{tar}$;
7. Let $G'$ be $G_c$ with the shadow of each $c_i$ removed;
8. Let $P$ = findPathsDAG($G'$, $s$, $L'_{tar}$);
9. For each $P_i \in P$ that ends at a new target for some $c_i$
10.    remove $P_i$ from $P$;
11.    $L^i_{tar} = L_{tar}$ in the shadow of $c_i$
12.    add findpathCycle($G$, $G_c$, $P_i$, $c_i$, $L^i_{tar}$) to $P$;
13. return $P$;

FIG. 8

```
Algorithm findpathCycle (G, Gc, p, c_i, L_tar)

Input:  Directed graph G, component graph Gc,
        connected component c_i, path to c_i in Gc
        target nodes T = t_1,...t_k in shadow of c_i
Output: Paths p_1,...,p_k for t_1...t_k.

1. while L_tar not empty
2.     let Y be a cycle in L_tar containing at least
              one node (if any exist) from L_tar ∩ c_i
              and the last node in p;
3.     count := 0;
4.     for each node n in L_tar in reverse topological order
              s.t. n is reachable from Y
5.         output p_n = p + count trips around Y
                  + path from last node in Y to n;
6.         remove n from L_tar;
7.         count ++;
```

METHODS AND APPARATUS FOR MAPPING SOURCE SCHEMAS TO A TARGET SCHEMA USING SCHEMA EMBEDDING

FIELD OF THE INVENTION

The present invention relates to the mapping of source documents to target documents and, more particularly, to methods and apparatus for mapping XML source documents to target documents.

BACKGROUND OF THE INVENTION

In order to exchange, migrate and integrate XML data, documents of a source XML (DTD) schema must be mapped to documents of a target schema. XML mappings can be defined, for example, in a query language, such as XQuery or XSLT, but such queries may be large and complex, and in practice it is desirable that XML mappings (1) guarantee type-safety and (2) preserve information.

The document produced by an XML mapping should conform to a target schema, guaranteeing type safety. This may be difficult to verify, however, for mappings defined in XQuery or XSLT. See, e.g., N. Alone et al., "XML with Data Values: Typechecking Revisited," Principles of Database Systems (PODS) (2001). Further, since in many applications one does not want to lose the original information of the source data, a mapping should also preserve information. Criteria for information preservation include: (1) invertibility (i.e., whether the source document can be recovered from the target document); and (2) query preservation (i.e., for a particular XML query language, whether all queries on source documents in that language be answered on target documents).

While a number of techniques have been proposed for information preservation for traditional database transformations, a need still exists for methods and apparatus for mapping XML documents. A number of tools and models have been proposed for finding XML mappings at the schema or instance-level, but such tools and models have not addressed invertibility and query preservation for XML. A need therefore exists for methods and apparatus for mapping source documents to target documents that ensure type-safety or preservation of information (or both). A further need exists for efficient methods and apparatus for finding information-preserving XML mappings.

SUMMARY OF THE INVENTION

Generally, methods and apparatus are provided for mapping XML source schemas to a target schema using schema embeddings. According to one aspect of the invention, one or more edges in the one or more source schemas are mapped to one or more paths in at least one target schema. The disclosed mapping techniques ensure that (i) one or more source documents that conform to one or more of the source schemas can be recovered from one or more target documents that conform to the at least one target schema, if a mapping exists between the one or more of the source schemas and the at least one target schema; (ii) queries on one or more source documents that conform to one or more of the source schemas in a given query language can be answered on one or more target documents that conform to the at least one target schema; and (iii) the one or more target documents conform to a target schema.

Initially, one or more local embeddings are identified for individual productions in the one or more source schemas. The local embeddings can then be assembled into a schema embedding using a random order or a quality-specific order of the local embeddings. In a further variation, a candidate pool of local embeddings is generated and a heuristic solution to Maximum-Independent-Set is employed to assemble a valid schema embedding. When a conflict is detected during the assembly of the schema embedding, one or more non-conflicting local embeddings are generated.

A more complete understanding of the present invention, as well as further features and advantages of the present invention, will be obtained by reference to the following detailed description and drawings.

BRIEF DESCRIPTION OF THE DRAWINGS

FIG. 3 illustrates exemplary pseudo-code for a findPathsDAG algorithm;

FIG. 4 illustrates exemplary pseudo-code for a traverse algorithm;

FIG. 5 illustrates exemplary pseudo-code for an ordered subroutine;

FIG. 6 illustrates exemplary pseudo-code for an exemplary QualityOrdered algorithm, based on the ordered subroutine of FIG. 5;

FIG. 7 illustrates exemplary pseudo-code for a findpahts algorithm; and

FIG. 8 illustrates exemplary pseudo-code for the findpathCycle algorithm.

DETAILED DESCRIPTION

The present invention provides methods and apparatus for mapping source documents to target documents using schema embedding. Generally, schema embedding is a natural extension of graph similarity in which an edge in a source DTD schema may be mapped to a path, rather than a single edge, in a target DTD.

Figure 1A:
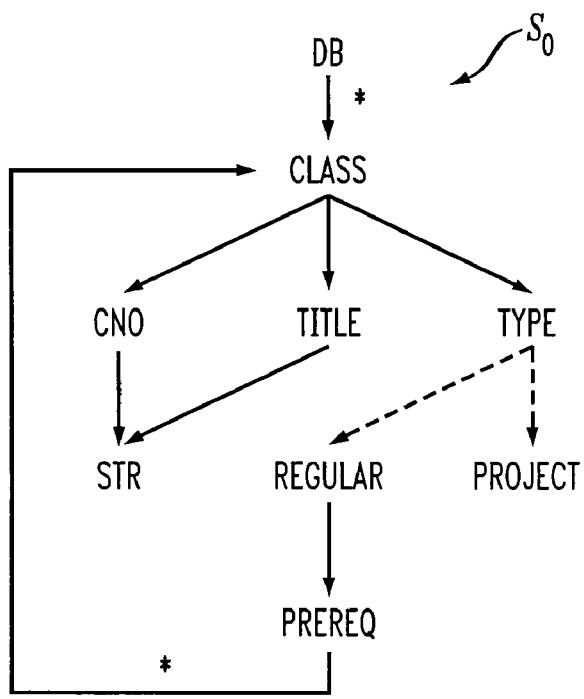
FIGS. 1A and 1B illustrate two exemplary source schemas (DTDs) $S_0$ and $S_1$, respectively.
Figure 1B:
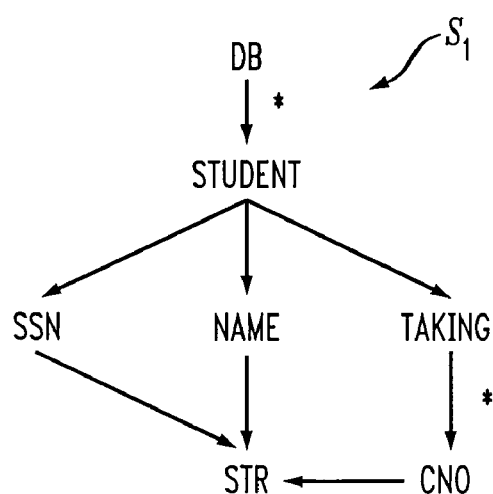
Figure 1C:
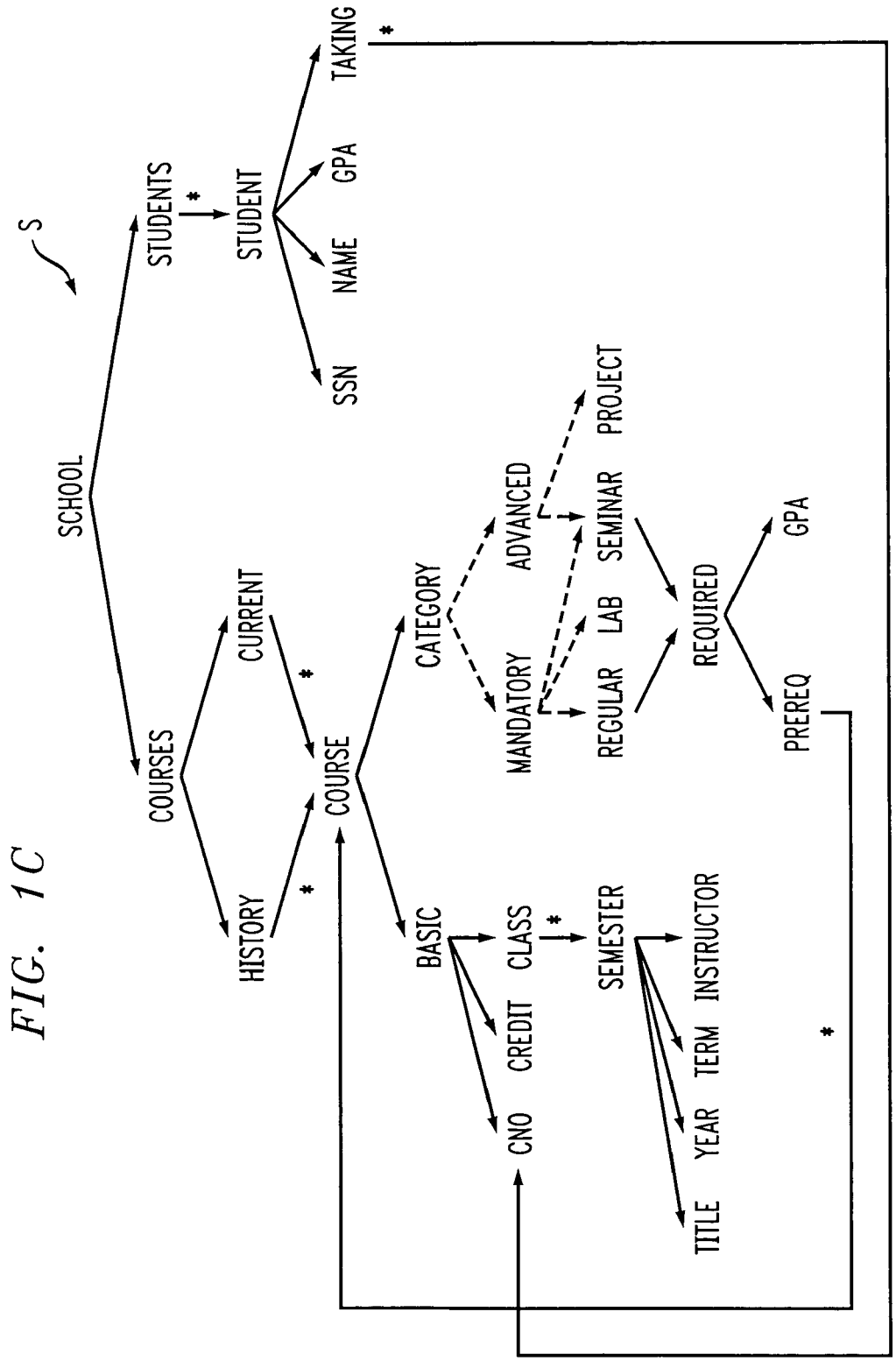
FIG. 1C illustrates an exemplary target schema (DTD) S.

FIGS. 1A and 1B illustrate two exemplary source schemas (DTDs) $S_0$, $S_1$ and FIG. 1C illustrate an exemplary target schema (DTD) S (the str child is omitted under cno, credit, title, year, term, instructor, gpa in FIG. 1C). A document of $S_o$ contains information of classes currently being taught at a school, and a document of $S_1$ consists of student data of the school. The user wants to map the document of $S_0$ and the document of $S_1$ to a single instance of S, which is to collect data about courses and students of the school in the last five years. Edges of different types are used to represent different constructs of a DTD. Namely, solid edges represent a concatenation type (a unique occurrence of each children), dashed edges represent disjunction (one and only one children), and star edges (edge labeled '*') represent Kleene star (zero or more children).

In the example shown in FIG. 1, invertibility requires the ability to reconstruct the original class $S_o$ and student $S_1$ documents from an integrated school document S, while query preservation requires the ability to answer XML queries posed on class and student documents $S_0$, $S_1$ using the school document S. While type safety and information preservation are clearly desirable, an additional feature is the ability to map documents of DTDs that have different structures. A given source DTD may differ in structure from a desired target DTD. This is typical in data integration, where the target DTD needs to accommodate data from multiple sources and thus cannot be similar to any of the sources.

The present invention provides methods and apparatus for information preserving XML mapping using schema embedding. Information preservation for XML mappings involves the notions of invertibility and query preservation. While the two notions coincide for relational mappings with respect to relational calculus, the present invention recognizes that they are in general different for XML mappings with respect to XML query languages. Furthermore, it is undecidable to determine whether or not an XML mapping defined in a simple fragment of XQuery (or XSLT) is information preserving.

To cope with the undecidability result, the present invention provides an XML mapping framework based on a novel notion of schema embeddings. A schema embedding is a natural extension of graph similarity in which an edge in a source DTD schema may be mapped to a path, rather than a single edge, in a target DTD. For example, the source DTDs and $S_o$ and $S_1$ of FIG. 1 can both be embedded in S, while there is no sensible mapping from them to S based on graph similarity. From a schema embedding, an instance-level XML mapping can be directly produced that has all the properties mentioned above. In particular, such mappings are invertible, query preserving with respect to regular XPath (an extension of XPath), and ensure type safety. As with schema-mapping techniques for other data models, by automatically producing this mapping the user is saved from writing and type-checking a complex mapping query. Moreover, the inverse and query rewriting functions for the mapping are efficient.

In addition, the present invention provides algorithms to compute schema embeddings. The disclosed schema embedding generation algorithms are NP-complete to find an embedding between two DTDs, even when the DTDs are nonrecursive. Thus, algorithms for finding embeddings are necessarily heuristic. A building block of the disclosed algorithms is an efficient algorithm to find a local embedding for individual productions in the source schema. Based on this, three heuristic algorithms are developed to compute embeddings.

As discussed further below in conjunction with FIG. 5, the first two algorithms repeatedly attempt to assemble local embeddings into a schema embedding (using a random or quality-specific order of the local embeddings, respectively), and when conflicts arise, attempt to generate new, non-conflicting local embeddings. The third algorithm generates a candidate pool of local embeddings, and then uses a heuristic solution to Maximum-Independent-Set to assemble a valid schema embedding.

DTDs, XPath Information Preservation

A. XPath and Regular XPath

Consider a class of regular XPath queries, denoted by $X_R$ and defined as follows:

$$p::=\epsilon|A|p/\text{text}(\ )|p/p||p\cup p|p^*|p[q],$$

$$q::=p|p/\text{text}(\ )=`c\ `|\text{position}(\ )=k|\neg q|q\wedge q|q\vee q$$

where $\epsilon$ is the empty path (self), A is a label (element type), '∪' is the union operator, '/' is the child-axis, and * is the Kleene star; p is an $X_R$ expression, k is a natural number, c is a string constant, and $\neg, \wedge, \vee$ are the Boolean negation, conjunction and disjunction operators, respectively.

An XPath fragment of $X_R$, denoted by ℵ, is defined by replacing p* with p//p in the definition above, where // is the descendant-or-self axis.

A (regular) XPath query p is evaluated at a context node v in an XML tree T, and its result is the set of nodes (ids) of T reachable via p from v, denoted by v[p].

B. DTDs

Consider DTDs of the form (Ele, P, r), where Ele is a finite set of element types; r is a distinguished type in Ele, called the root type; and P defines the element types. For each A in Ele, P(A) is a regular expression of the form:

$$a::=str|\epsilon|B_1,\ldots,B_n|B_1+\ldots+B_n|B^*$$

where str denotes PCDATA, $\epsilon$ is the empty word, B is a type in Ele (referred to as a child of A), and '+', ',' and '*' denote disjunction (with n>1), concatenation and the Kleene star, respectively. A→P(A) is referred to as the production of A. It is noted that this form of DTDs does not lose generality since any DTDs can be converted to this form (in linear time) by introducing new element types, and (regular) XPath queries on S can be rewritten into equivalent (regular) XPath queries on S' in PTIME. See, M. Benedikt et al., "Xpath Satisfiability in the Presence of DTDs, PODS (2005).

A DTD S can be represented as a labeled graph $G_S$, referred to as the graph of S. For each element type A in S, there is a unique node labeled A in $G_S$, referred to as the A node. From the A-node there are edges to nodes representing child types in P(A), determined by the production A→P(A) of A. There are three different types of edges indicating different constructs. Specifically, if P(A) is $B_1,\ldots,B_n$ then there is a solid edge from the A node to each $B_i$ node; it is labeled with a position k if $B_i$ is the k-th occurrence of a type B in P(A) (the label can be omitted if $B_i$'s are distinct). If P(A) is $B_1+\ldots+B_n$ then there is a dashed edge from the A node to each $B_i$ node (without loss of generality it is assumed that $B_i$'s are distinct in disjunction). If P(A) is B*, then there is a solid edge with a '*' label from the A node to the B node. Note that a DTD is recursive if its graph is cyclic. When it is clear from the context, the DTD and its graph are used interchangeably, both referred to as S; similarly for A element type and A node.

For example, FIG. 1 shows graphs representing three DTDs, where FIGS. 1A and 1C depict recursive DTDs.

An XML instance of a DTD S is a node-labeled tree that conforms to S. I(s) is used to denote the set of all instances of S. A DTD S is consistent if it has no useless element types, i.e., each type of S has an instance.

C. Invertibility and Query Preservation

For XML DTDs $S_1$, $S_2$, a mapping $\sigma_d: I(S_1) \to I(S_2)$ is invertible if there exists an inverse $\sigma_d^{-1}$ of $\sigma_d$ such that for any XML instance $T \in I(S_1), \sigma_d^{-1}(\sigma_d(T))=T$, where the notation $f(T)$ denotes the result of applying a function (or mapping, query) $f$ to T. In other words, the composition $\sigma_d^{-1} \circ \sigma_d$ is equivalent to the identity mapping id, which maps an XML document to itself.

For an XML query language L, a mapping $\sigma_d$ is query preserving with respect to L if there exists a computable function F:L→L such that for any XML query Q∈L and any $T \in I(S_1)$, $Q(T)=F(Q)(\sigma_d(T))$, i.e., $Q=F(Q) \circ \sigma_d$.

Generally, invertibility is the ability that the original source XML document can be recovered from the target document; query preservation with respect to L indicates whether or not all queries of L on any source T of $S_1$ can be effectively answered over $\sigma_d(T)$, i.e., the mapping $\sigma_d$ does not lose information of T when L queries are concerned.

The notions of invertibility and query preservation are inspired by (calculus) dominance and query dominance that were proposed for relational mappings. In contrast to query dominance, query preservation is defined with respect to a given XML query language that does not necessarily support query composition. Invertibility is defined for XML mappings and it only requires $\sigma_d^{-1}$ to be a partial function defined on $\sigma_d(I(S_1))$.

A mapping $\sigma_d: I(S_1) \to I(S_2)$ is said to be information preserving with respect to L if it is both invertible and query preserving with respect to L.

Information Preservation

A. Invertibility and Query Preservation

Calculus dominance and query dominance have been shown to be equivalent for relational mappings. In contrast, invertibility and query preservation do not necessarily coincide for XML mappings and query languages. Recall the class X of XPath queries defined in the previous section.

There exists an invertible XML mapping that is not query preserving with respect to X; and there exists an XML mapping that is not invertible but is query-preserving with respect to the class of $\aleph$ queries without positions( ) qualifier.

Sufficient conditions are identified for the two to coincide:

Let L be any XML query language and $\sigma_d$ be a mapping from $I(S_1) \to I(S_2)$ If the identity mapping id is definable in L and $\sigma_d$ is query preserving with respect to L, then $\sigma_d$ is invertible.

Suppose L is composable, i.e., for any $Q_1$, $Q_2$ in L, $Q_2 \circ Q_1$ is in L; if $\sigma_d$ is invertible and $\sigma_d^{-1}$ is expressible in L, then $\sigma_d$ is query preserving with respect to L.

Recall the class $X_R$ of regular XPath queries defined above. Although the identity mapping id is not definable in $X_R$, query preservation with respect to $X_R$ is a stronger property than invertibility.

If an XML mapping $\sigma_d$ is query preserving with respect to $X_R$, then $\sigma_d$ is invertible. Conversely, there exists a mapping $\sigma_d$ that is invertible but is not query preserving with respect to $X_R$.

B. Complexity

XML mappings are commonly defined in XQuery or XSLT. A natural yet important question is to decide whether or not an XML mapping is invertible or query preserving with respect to a query language L. Unfortunately, this is impossible for XML mappings defined in any language that subsumes first-order logic (FO, or relational algebra), e.g., XQuery, XSLT, even when L consists of projection queries only. Thus, it is beyond reach to answer these questions for XQuery or XSLT mappings.

It is undecidable to determine, given an XML mapping ad defined in any language subsuming FO, 1. whether or not $\sigma_d$ is invertible; and
2. whether or not $\sigma_d$ is query preserving with respect to projection queries.

Schema Embeddings for XML

The present invention provides a class of XML mappings that are information preserving.

XML mappings are specified at the schema level embeddings, and an automated derivation of instance-level mappings are provided from these embeddings. Schema embeddings, as used herein, extend the conventional notion of graph similarity by allowing edges in a source DTD schema to be mapped to a path in a target DTD with a "larger information capacity". For example, a STAR edge can only be mapped to a path with at least one STAR edge.

A. Schema Level Embeddings

Consider a source XML DTD schema $S_1 = (E_1, P_1, r_1)$ and a target DTD $S_2 = (E_2, P_2, r_2)$. Generally, a schema embedding $\sigma$ is a pair of functions $(\lambda, path)$ that maps each A type in $E_1$ to a $\lambda(A)$ type in $E_2$, and each edge (A, B) in $S_1$ to a unique path (A,B) from $\lambda(A)$ to $\lambda(B)$ in $S_2$, such that the $S_2$ paths mapped from sibling edges in $S_1$ are sufficiently distinct to allow information to be preserved.

(1) $X_R$ Paths

An $X_R$ over a DTD $S=(E,P,r)$ is an $X_R$ query of the form $p = \eta_1 / \ldots / \eta_k$ where $k \geq 1$, $\eta_i$ is of the form A[q], and q is either true or a position( ) qualifier, such that $\rho$ is a path in S and it carries all the position labels on the path. An $X_R$ path is called an AND path (respectively, OR path, and STAR path) if it is nonempty and consists of only solid or star edges (respectively, of solid edges and at least one dashed edge, and of solid edges and at least one edge labeled * ). Referring to FIG. 1C, for example, basic/class/semester/title is an AND path as well as a STAR path, and mandatory/regular is an OR path.

(2) Name Similarity

A similarity matrix for $S_1$ and $S_2$ is an $|E_1| \times |E_2|$ matrix, att, of numbers in the range [0,1]. For any $A \in E_1$ and $B \in E_2$ att (A,B) indicates the suitability of mapping A to B, as determined by human domain experts or computed by an existing algorithm, such as the algorithm described in A. Doan et al., "Reconciling Schemas of Disparate Data Sources: A Machine-Learning Approach," SIGMOD (2001).

(3) Type Mapping

A type mapping $\lambda$ from $S_1$ to $S_2$ is a (total) function from $E_1$ to $E_2$; in particular, it maps the root of $S_1$ to the root of $S_2$, i.e., $\lambda(r_1) = r_2$. A type mapping $\lambda$ is valid with respect to a similarity matrix att if for any $A \in E_1$, att $(A, \lambda(A)) > 0$.

(4) Path Mapping

A path mapping from $S_1$ to $S_2$, denoted by $\sigma: S_1 \to S_2$ is a pair ($\lambda$, path), where $\lambda$ is a type mapping and path is a function that maps each edge (A,B) in $S_1$ to an $X_R$ path, path (A,B), that is from $\lambda(A)$ to $\lambda(B)$ in $S_2$.

For particular element type A in $E_1$, $\sigma$ is valid for A if the following conditions hold, based on the production $A \to P_1(A)$ in $S_1$:

If $P_1(A) = B_1, \ldots, B_1$ then for each i, path $(A, B_i)$ is an AND path from $\lambda(A)$ to $\lambda(B_i)$ that is not a prefix of path $(A, B_j)$ for any $j \neq i$;

If $P_1(A) = B_1 + \ldots + B_1$, then for each i, path $(A, B_i)$ is an OR path from $\lambda(A)$ to $\lambda(B_i)$ that is not a prefix of path $(A, B_j)$ for any $j \neq i$;

If $P_1(A) = B^*$, the path $(A, B_i)$ is a STAR path;

If $P_1(A) = str$, then path (A,str) is an AND path ending with text ( ).

The validity requires a path type condition and a prefix-free condition, which, as will be seen shortly, are important for deriving the instance-level mapping from $\sigma$.

FIGS. 2A through 2E illustrate path mappings for DTDs. FIGS. 2A through 2E, each comprise pairs of source (on the left) and target (on the right) DTDs, for which a type mapping $\lambda$ is defined as $.\lambda(X) = X'$ for X in $\{A,B,C\}$, except in FIG. 2C where both $\lambda(C) = B'$ and $\lambda(B) = B'$.

Figure 2C:
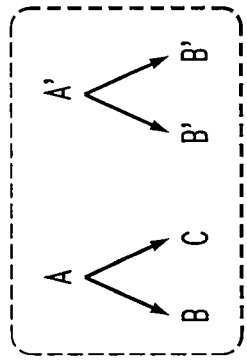
FIGS. 2A through 2E illustrate path mappings for DTDs.
Figure 2B:
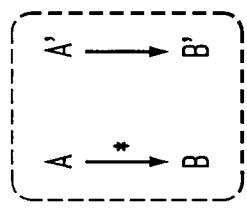
Figure 2A:
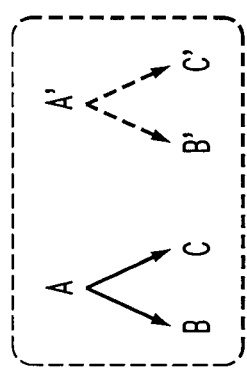

For FIG. 2A, there is no valid path embedding from the source DTD to the target; intuitively, B and C must coexist in a source document while only one of B' and C' exists in the target. Similarly for FIG. 2B, where the source cannot be mapped to the target since there-are possibly multiple B elements in the source, which cannot be accommodated by the target. For FIG. 2C, a valid embedding is path (A,B)=B'[position( )=1] and path (A,C)=B'[position( )=2]. For FIG. 2D, there is no valid embedding since path (A,B) is a prefix of path (A,C), violating the prefix-free condition. For FIG. 2E, a valid embedding is path (A,B)=A'/B' (by unfolding the cycle once) and path (A,C)=B'/C'.

(5) Schema Embedding

A schema embedding from $S_1$ to $S_2$ valid with respect to a similarity matrix att, is a path mapping $\sigma = (\lambda, path)$ from $S_1$ to $S_2$ such that $\lambda$ is valid with respect to att, and $\sigma$ is valid for every element A in $E_1$.

Assume a similarity matrix att such that att (A,A')=1 for all A in the DTD $S_o$ of FIG. 1A and A' in S of FIG. 1C. The source DTD $S_o$ can be embedded in the target S via $\sigma_1 = (\lambda_1, path_1)$ defined as follows:

$\lambda_1$ (db)=school, $\lambda_1$(class)=course, $\lambda_1$ (type)=category,
$\lambda_1$ (A)=A/* A: cno, title, regular, project, prereq, str */
path$_1$ (db, class)=courses/current/course
path$_1$ (class, cno)=basic/cno
path$_1$ (class, title)=basic/class/semester/title
path$_1$ (class, type)=category
path$_1$ (type, regular)=mandatory/regular
path$_1$ (type, project)=advanced/project
path$_1$ (regular, prereq)=required/prereq
path$_1$ (prereq, class)=course
path$_1$ (A, str)=text( ) /* A for cno, title */

Note that path$_1$ (A,B) is a path in S denoting how to reach $\lambda_1$ (B) from $\lambda_1$ (A), i.e., the path is relative to $\lambda_1$(A). For example, path$_1$ (type, project) indicates how to reach project from a category context node in S, where category is mapped from type in $S_0$ by $\lambda_1$. Also observe that the similarity matrix att imposes no restrictions: any name in the source can be mapped to any name in the target; thus the embedding here is decided solely on the DTD structures.

In contrast, $S_0$ cannot be mapped to S by graph similarity, which requires that node A in the source is mapped (similar) to B in the target only if all children of A are mapped (similar) to children of B. In other words, graph similarity maps an edge in the source to an edge in the target.

(6) Embedding Quality

There are many possible metrics. The quality of a schema embedding $\sigma=(\lambda,$ path) with respect to att is the sum of att $(A,\lambda(A))$ for $A \in E_1$, and $\sigma$ is invalid if $\lambda$ is invalid with respect to att. This metric is referred to as qual ($\sigma$, att)

B. Instance Level Mapping

For a valid schema embedding $\sigma=(\lambda$, path) from $S_1$ to $S_2$, the semantics are provided by defining an instance-level mapping $\sigma_d:I(S_1) \rightarrow I(S_2)$ referred to as the XML mapping of $\sigma$.

$\sigma_d$ is defined by presenting an algorithm that, given an instance $T_1$ of $S_1$, computes an instance $T_2=\sigma_d(T_1)$ of $S_2$. Generally, $\sigma_d$ constructs $T_2$ top down starting from the root $r_2$ of $T_2$, mapped from the root $r_1$ of $T_1$ (recall $\lambda(r_1)=r_2$). Inductively, for each $\lambda(A)$ element u in $T_2$ that is mapped from an A element v in T, $\sigma_d$ generates a distinct $\lambda(B)$ node u' in $T_2$ for each distinct B child v' of v in $T_1$, such that u' is reached from u via path (A,B) in $T_2$, i.e., u' is uniquely identified by the $X_R$ path from u. More specifically, the construction is based on the production $A \rightarrow P_1(A)$ in $S_1$ as follows.

(1) $P_A(A)$ is $B_1, \ldots, B_n$. For each child $v_i$ of v, $\sigma_d$ creates a node $u_i$ bearing the same id as $v_i$. These nodes are added to $T_2$ as follows. For each $i \in [1,n]$, $u_i$ is added to $T_2$ by creating path $(A, B_i)$ emanating from u to $u_i$, such that the path shares any prefix already in $T_2$ which were created for, e.g., path $(A,B_j)$ for $j<i$.

(2) $P_1$ (A) is $B_1 + \ldots + B_n$. Here, v in $T_1$ must have a unique child $v_i$. For $v_i$, $\sigma_d$ creates a node $u_i$ bearing the same id as $v_i$, and adds $u_i$ to $T_2$ via path $(A,B_i)$ as above.

(3) $P_1(A)$ is B*. By the definition of valid path function, path (A, B) is of form path $(A, A_1)/B_1/$path$(B_1,B)$, where $A_1$ is the first type defined in terms of Kleene star in $P_2$, i.e., $P_2(A_1)=B*_1$. Let $v_1, \ldots, v_k$ be all the children of v. Then, $\sigma_d$ creates $u_1, \ldots, u_k$ bearing the same id's as $v_1, \ldots, v_k$, and adds these nodes to $T_2$ as follows. It first generates a singe path $(A, A_1)$ from u to an A' node u' if it does not already exist in $T_2$, and for each $i \in [1,k]$, it creates a distinct i-th $B_1$ child if it is not already in $T_2$. From the i-th $B_i$ node it generates path $(B_1,B)$ leading to $u_i$, in the same way as in (1) above. Note that the order of the children of v is preserved by $\sigma_d$.

(4) $P_1(A)$ is str. Same as (1) except the last node of path (A,str) in $T_2$ is a text node holding the same value as the text node in $T_1$.

The process is repeated until all nodes in $T_1$ are mapped to nodes in $T_2$. $\sigma_d(T)$ is completed by adding necessary default elements such that $\sigma_d(T)$ conforms to $S_2$. As previously indicated, consistent DTDs can be assumed without loss of generality. Thus, for each element type A in $S_2$, a fixed instance $I_A$ of A can be selected and used as a default element of A.

Consider the XML mapping $\sigma_d$ of the embedding defined above. Given an instance $T_1$ of $S_o$ of FIG. 1A, $\sigma_d$ generates a tree $T_2$ of S of FIG. 1C as follows: $\sigma_d$ first creates the root school of $T_2$, bearing the node id of the root db of $T_1$. Then, $\sigma_d$ creates a single courses child x of school, a single current child y of x, and for each class child c of db, $\sigma_d$ creates a distinct course child z of y bearing the id of c, such that the course children of y are in the same order as the class children of db. $\sigma_d$ then maps the cno, title, type children of c to cno, title, category descendants of z in $T_2$ based on path$_1$. In particular, to map title in $S_o$, $\sigma_d$ creates a single class child $x_c$ of the basic element, a single semester child $x_s$ under $x_c$ (although class is defined with a Kleene star), and then a title child under $x_s$.

For the category element w mapped from the type child t of c, $\sigma_d$ creates a distinct path advanced/project under w if t has a project child, or a mandatory/regular path otherwise, but not both. The process proceeds until all nodes in $T_1$ are mapped to $T_2$. Finally, default elements of history, credit, year, term, instructor and gpa are added to $T_2$ such that $T_2$ conforms to S. At the last stage, no children of disjunctive types category, mandatory or advanced are added, and no children are created under history. That is, default elements are added only when necessary.

Note that $\sigma_d(T_1)$ does not have to be a new document of S constructed starting from scratch. Under certain conditions, a mild variation of $\sigma_d$ allows an existing instance $T_2$ of S to be expanded to accommodate nodes of $T_1$ by modifying default elements in $T_2$ and introducing new elements.

$\sigma_d$ is well defined. That is, given any $T_1$ in $I(S_1)$, $\sigma_d(T_1)$ is an XML tree that conforms to $S_2$. This is nontrivial due to the interaction between different paths defined for disjunction types in the schema mapping $\sigma$ among other things. Consider, for example, path(type, project) in the above embedding example. The path requires the existence of a regular child under a mandatory element m, which is in turn a child under a category element c in an instance of S. Thus, it rules out the possibility of adding an advanced child under c or a lab child under m perhaps requested by a conflicting path in $\sigma$. As discussed further below, however, the prefix-free condition in the definition of valid functions ensures that conflicting paths do not exist, and thus prevents violation caused by conflicting paths.

$\sigma_d$ is infective. In other words, $\sigma_d$ maps distinct nodes in $T_1$ to distinct nodes in $\sigma_d(T_1)$, a property necessary for information preservation. Indeed, $\sigma$ determines an injective path-mapping function $\delta$ such that, for each $X_R$ path $p=A_1[q_1]/ \ldots /A_k[q_k]$ in $S_1$ from $r_1$, $\delta(p)$ is path$(r_1,A_1)[q_1]/ \ldots /$path$(A_{k-1}, A_k)[q_k]$, an $X_R$ path in $S_2$ from $r_2$, by substituting path $(A_i, A_{i+1})$ for each $A_{i+1}$ in p. Since each node in $T_1$ is uniquely determined by an $X_R$ path from the root, it follows the $\sigma_d$ is injective.

Thus, the XML mapping $\sigma_d$ of a valid schema embedding $\sigma:S_1 \rightarrow S_2$ is well defined and injective.

C. Properties of Schema Embeddings

The XML mapping $\sigma_d$ of a valid schema embedding C is guaranteed to type check. In addition, $\sigma_d$ and $\sigma$ also have all the other desired properties.

(1) Information Preservation

Information preservation is guaranteed by schema embeddings. Recall regular XPath $X_R$.

The XML mapping $\sigma_d$ of a valid schema embedding $\sigma: S_1 \to S_2$ is invertible and is query preserving with respect to $X_R$. More precisely, (a) there exists an inverse $\sigma_d^{-1}$ of $\sigma_d$ that, given any $\sigma_d(T)$, recovers T in $O(|\sigma_d(T)|^2)$ time; and (b) there is a query translation function F that given any $X_R$ query Q over $S_1$, computes an $X_R$ query F(Q) equivalent with respect to $\sigma_d$ over $S_2$ in $O(|Q||\sigma||S_1|)$ time.

The $X_R$ query Q below, over $S_0$ of FIG. 1A, is to find all the classes that are (direct or indirect) prerequisites of CS331. It is translated to an $X_R$ query Q' over S of FIG. 1C, which is equivalent with respect to the mapping $\sigma_d$ given in the above example, i.e. $Q(T)=Q'(\sigma_d(T))$ for any $T \in I(S_o)$, when evaluated on T with the root as the context node.

Q: class[cno/text( )='CS331']/(type/regular/prereq/class)*.

Q': courses/current/course[cno/text( )='CS331']/(category/mandatory/regular/required/prereq/course)*.

In contrast, the notion of graph similarity ensures neither invertibility nor query preservation with respect to $X_R$. As a simple example, the source and target schemas in FIG. 2A are bisimilar (if the conventional definition of graph similarity is not extended to accommodate the cardinality constraints of different DTD constructs). However, there exists no instance-level mapping from the source to the target, not to mention inverse mappings and query translation.

(2) Multiple Sources

In contrast to graph similarity, it is possible to embed multiple source DTD schemas to a single target DTD, as illustrated by the example below. This property is particularly useful in data integration. The embedding $\sigma_2 = (\lambda_2, path_2)$ below maps $S_1$ of FIG. 1B to the target DTD S of FIG. 1C.

$\lambda_2$(db)=school
$\lambda_2$(A)=A /* A:student, ssn, name, taking, cno */
$path_2$(db, student)=students/student
$path_2$(student, B)=B /*B:ssn, name, taking*/
$path_2$(taking, cno)=cno
$path_2$(C,str)=text( )/*C: ssn, name, cno*/

Taken together with $\sigma_1$ of the earlier example, this allows a course document of $S_o$ and a student document of $S_1$ to be integrated into a single school instance of the target DTD S.

In general, given multiple source DTDs $S_1, \ldots, S_n$ and a single target DTD S, one can define schema embeddings $\sigma_i: S_i \to S$ to simultaneously map $S_i$ to S. Their XML mappings $\sigma_d^1, \ldots, \sigma_d^n$ are invertible and query preserving with respect to $X_R$ as long as $\delta_i$, $\delta_j$ are pairwise disjoint, where $\delta_i$ is the path mapping function derived from $\sigma_i$ to map paths $X_R$ from root in $S_i$ to $X_R$ paths from root in S. The instance-level XML mapping $\sigma_d$ is a composition of individual $\sigma_d^1, \ldots, \sigma_d^n$, such that $\sigma_d^i$ increments the document constructed by $\sigma_d^j$'s for j<i by modifying default elements or introducing new elements, as described earlier.

(3) Small Model Property

The result below provides an upper bound on the length |path(A,B)|, and allows the search space to be reduced when defining or finding an embedding.

If there exists a valid schema embedding $\sigma: S_1 \to S_2$, then there exists one such that for any edge (A,B) in $S_1$, $|path(A,B)| \leq (k+1)|E_2|$, where $S_2=(E_2, P_2, r_2)$, and k is the size of the production $P_2(A)$.

Computing Schema Embeddings

An XML schema embedding $\sigma: S_1 \to S_2$, that is valid with respect to the matrix att, is obtained from two input DTDs $S_1$ and $S_2$ and the matrix att if it exists.

A reasonable goal is to find an embedding $\sigma: S_1 \to S_2$ with as high a value for qual ($\sigma$, att) as possible. The ability to efficiently find good solutions to this problem will lead to an automated tool that, given two DTD schemas, computes candidate embeddings to recommend to users.

This problem is NP-complete. Its intractability is rather robust: it remains NP-hard for nonrecursive DTDs even when they are defined in terms of concatenation types only.

In light of the intractable results, two efficient yet accurate heuristic algorithms are provided for computing schema embedding candidates in the rest of the section.

A. Notations

Recall that a schema embedding is a path mapping $\sigma$ that is valid for each element type A in $S_1$. Since the validity conditions for A involve only A's immediate children, it is useful to talk about mappings local to A. A local mapping for A is simply a partial path mapping $(\lambda_o, path_o)$ such that (a) $\lambda_0$ and $path_0$ are defined exactly on all the element types appearing in A's production $A \to P_1(A)$, including A itself, and (b) it is valid, i.e., it satisfies the path type and prefix-free conditions given in the previous section.

Consider two partial mappings, $\sigma_o=(\lambda_o, path_o)$ and $\sigma_1=(\lambda_1, path_1)$. $\lambda_o$ and $\lambda_1$ conflict on A if both $\lambda_o(A)$ and $\lambda_1(A)$ are defined, but $\lambda_o(A) \neq \lambda_1(A)$, and similarly for $path_o$ and $path_1$. $\sigma_o$ and $\sigma_1$ are consistent if they do not conflict, either on $\lambda$ or path. The union of consistent partial mappings, denoted by $\sigma_1 \oplus \sigma_1$, is a partial embedding defined to be $(\lambda_1 \oplus \lambda_2, path_1 \oplus path_2)$, where $$\lambda_1(A) \oplus \lambda_2(A) = \begin{cases} \lambda_1(A) & \text{if } \lambda_2(A) \text{ is } \bot \text{ (undefined)} \\ \lambda_2(A) & \text{if } \lambda_1(A) \text{ is } \bot \\ \lambda_1(A) & \text{otherwise} \end{cases}$$

Similarly for $path_1(A,B) \oplus path_2(A, B)$.

A technique is presented for finding local embeddings. Making use of this algorithm, three heuristics are then provided for finding embedding candidates. The first two are based on randomized programming and the last is by reduction from the problem to the Max-Weight-Independent-Set problem for which a well developed heuristic tool is available.

A. Finding Valid Local Mappings

An algorithm to find a local embedding $\sigma_o=(\lambda_o, path_o)$ is provided when the partial type mapping $\lambda_o$ is fixed, as this is a key building block of the schema-embedding algorithms. This algorithm is then extended to handle the general case when $\lambda_o$ is not given. To simplify the presentation, nonrecursive DTDs are discussed, i.e., DTDs with a directed acyclic graph (DAG) structure, but the disclosed technique also works on recursive (cyclic) DTDs, as would be apparent to a person of ordinary skill.

(1) Finding Valid Paths

Let $A \in E_1$ be a source element type with production $A \to P_1(A)$, in which the element types appearing in $P_1(A)$ are $B_1, \ldots, B_k$. Assume that the type mapping $\lambda_o$ is already given as a partial function from $E_1$ to $E_2$ that is defined on $B_1, \ldots, B_k$ and A. The Valid-Paths problem is to find paths $path_o(A, B_1), \ldots, path_o(A, B_k)$ such that $(\lambda_o, path_o)$ is a valid local mapping for A.

The validity conditions stated above for embeddings require that (a) target paths for each edge are of the appropriate type (AND, OR, or STAR path), and (b) that the target path for an edge is not a prefix of a sibling's target path. The second condition is abstracted as a directed-graph problem: Given a directed graph G=(V, E), a source vertex s and a bag of target vertices $L_{tar}=\{(t_1 \ldots t_k)\}$, find paths $p_1, \ldots, p_k$ such that no path is equal to or is the prefix of another. That is, for all $i \neq j, \rho_j \neq \rho_i/\rho_{ij}$ for any $\rho_{ij}$ including the empty path. In contrast to most sub-problems of schema-embedding, this can be solved in polynomial time. The solution is introduced by giving an algorithm that works only on a DAG and the solution is then extended below to handle cycles.

FIG. 3 illustrates exemplary pseudo-code for a findPaths-DAG algorithm 300. The findPathsDAG algorithm 300 finds prefix-free paths in a DAG. The algorithm 300 depends on the recursive procedure traverse 400, shown in FIG. 4. FIG. 4 illustrates exemplary pseudo-code for a traverse algorithm 400. Generally, the algorithm 300 modifies a simple (but exponential) algorithm to recursively enumerate all paths in a DAG in such a way that prefix-free paths are found, but excessive running time is avoided. Generally, the traverse algorithm 400 conducts a depth-first-search on the input graph G, enumerating paths from the source node s to target nodes in $L_{tar}$ and identifies prefix-free ones. The traverse algorithm 400 uses a (global) boolean array marked (n) to keep track of whether the subgraph rooted at a node n has been searched and yielded no matches for nodes in $L_{tar}$, and if so, it does not re-enter the subgraph. A (local) variable ret is used to indicate whether the search of a subgraph finds any matches to nodes in $L_{tar}$.

If line 5 (in which the algorithm returns early) and line 11 (in which nodes are marked to avoid revisiting them) are removed, the resulting algorithm considers every possible path leading to nodes in $L_{tar}$ and assigns one path to each $n \in L_{tar}$. The resulting algorithm does not avoid assigning one node the prefix of another path. The prefix-free condition, however, is assured by the return at line 5 without affecting correctness, since a suffix of the path assigned to n could only be generated by continuing the recursion from this node.

In line 11, if no new target nodes were found in the subtree of a node when it was explored by the recursive calls of lines 7-10, then the current node will not be on any path to any n' remaining in $L_{tar}$.

Consider the schema embedding problem shown in FIG. 1. Assume that att (regular, seminar) and att (project, advanced) in $S_0$ are 0.75. This means that the bag of possible target matchings for source tags {regular, project} in $S_0$ can be {|seminar, advanced|} from S. The traverse algorithm 400 is then invoked with S, category, ρ (which is empty), and $L_{tar}$ as {|seminar, advanced|}. The first call to the traverse algorithm 400 would result in all edges from category to be recursed. Say, the algorithm first picks the edge to advanced. Line 2 of the traverse algorithm 400 would check advanced to be in $L_{tar}$ and add the path to advanced into P. It would then return back from the recursion and try the other edges from category in lines 7 though 10. This would result in a prefix-free path mandatory/seminar which would then be added to P.

To analyze the performance of the findPathsDAG algorithm 300, consider the traverse algorithm 400 as a sequence of forward and backward traversals of edges in the graph. A forward traversal occurs at line 9 and a backward traversal at lines 1, 5 and 12. Clearly, the number of forward traversals and backward traversals in a run are the same. Further, observe that one returns from an un-marked node at line 5 only on the path back from some node newly removed from $L_{tar}$. Thus, there can be at most $|L_{tar}||V|$ such backward steps, and at most $|E|$ other backward steps (which mark the child of the edge traversed). Since G is a DAG, the algorithm 300 is in $O(|L_{tar}||V|)$ time.

To use the findPathsDAG algorithm 300 in the algorithms for schema embedding, the paths returned must match the types needed for $n \in L_{tar}$. That is accomplished as the type of a path can be maintained incrementally as it is lengthened and shortended (by storing counts of nodes of each type), and be checked at line 2.

(2) Schema Embeddings with a Given λA

This algorithm can be used to directly find a schema embedding $\sigma=(\lambda,\text{path})$ from $S_1$ to $S_2$ when the type mapping λ is a given total function from $E_1$ to $E_2$. As previously indicated, the validity conditions for any A in $E_1$ involve only A's children; thus to find path, only valid paths need to be found for each A in $E_1$ and take the union of these valid local embeddings. This yields an $O(|S_1||S_2|)$ algorithm to find embeddings in this special setting, which is not so uncommon since one may know in advance which target type a source type should map to, based on, e.g., machine-learning techniques.

(3) Handling Multiple Targets

To find valid local mappings when λ is not given, there are multiple possible target nodes for each source node. The general local-embedding problem is to find a local embedding $(\lambda_o, \text{path}_o)$ when $\lambda_o$ may not be fixed. This problem is no longer tractable as shown below.

The local-embedding problem is NP-hard for nonrecursive DTDs.

One heuristic approach to finding local embeddings is to extend the findPathsDAG algorithm 300 as follows. The set of all pairings of source nodes A and possible matches for A are computed from att and passed as $L_{tar}$. Line 3 of the traverse algorithm 400 is modified to (a) pick an arbitrary pair with the current node as the target from $L_{tar}$ at line 2 and (b) remove all pairs associated with source node A from $L_{tar}$ at line 3. While this may work, it is essentially a greedy algorithm and may not find a solution if one exists. To compensate for this, a randomized variant findPathsRand (not shown) may be used which (a) picks a random source node associated with n at line 2 of the traverse algorithm 400, and (b) tries outgoing edges from n at line 7 in random order. The ability of findPathsRand to find embeddings varies with the size of $L_{tar}$.

(4) Handling Cycles

Figure 2E:
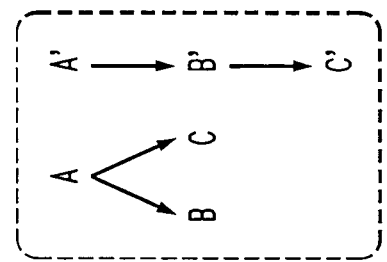
Figure 2D:
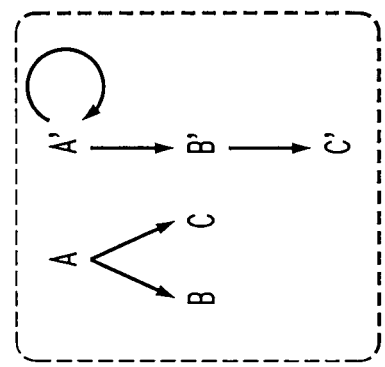

Schemas are frequently cyclic (recursive), and the algorithms as presented so far only handle DAGs. An arbitrary number of paths can be generated by repeated loops around some cycle on the path to a target, and careful use of these paths can guarantee the prefix-free property (FIG. 2E gives such an example, in which the cycle is unfolded once to get a prefix-free path, in contrast to FIG. 2D). The findPathsDAG algorithm 300 can be extended to allow limited exploration of cycles limited by (a) no more than k trips through visited nodes and (b) no more than l total path length. A bound on k and l is given by the following (and usually k and l are set to small numbers):

If there exists a valid schema embedding $\sigma: S_1 - S_2$, then there exists one such that for any edge (A,B) in $S_1$, $|\text{path}(A,B)| \leq (k+1)|E_2|$, where $S_2=(E_2,P_2,r_2)$, and k is the size of production $P_2(A)$.

B. Three Methods for Finding Schema Embeddings

Three heuristic embedding-search algorithms are discussed hereinafter, namely, QualityOrdered, RandomOrdered and RandomMaxInd.

(1) Finding Solutions with Ordered Algorithms

The first two heuristics are based on an ordered subroutine 500, shown in FIG. 5. A key data structure in the ordered subroutine 500 is a table, C, where C(A) is a set of known local embeddings for a source node A. The initialization of this table is discussed later. Given C and an ordered set 0 of source schema element types, the ordered subroutine 500 tries to assemble a consistent solution σ by considering each A in O order (line 2), and trying to find a local embedding $\sigma_A$ in C(A) which can be merged with the existing σ without a conflict (lines 3-8).

FIG. 6 illustrates exemplary pseudo-code for an exemplary QualityOrdered algorithm 600, based on the ordered subroutine 500. In the QualityOrdered algorithm 600, C(A) is initialized with a single randomly chosen local embedding for each source node A. The ordering O is sorted by the quality of the local embedding.

In a second variation, referred to as a RandomOrdered algorithm (not shown), C is the complete set of local embeddings discovered so far for each source node (lines 4 and 5 in FIG. 6), while O is a random ordering of source nodes (line 6 in FIG. 6).

In a third variation, referred to as a RandomMaxInd algorithm (not shown), the embedding is assembled from two DTDs $S_1$ and $S_2$, a similarity matrix att, and a table C. The RandomMaxInd algorithm generates a schema embedding $\sigma: S_1 \rightarrow S_2$ that is valid with respect to att, formed as the union of a subset of embeddings in C, if one exists.

The assemble-embedding problem is NP-hard for nonrecursive DTDs.

The RandomMaxInd heuristic takes the approach of reducing the assemble-embeddings problem to the problem of finding high-weight independent sets in a graph. The RandomMaxInd heuristic uses an existing heuristic solution, described in S. Busygin et al., "A Heuristic for the Maximum Independent Set Problem Based on Optimization of a Quadratic Over a Sphere, J. Comb. Optim., 6(3), 287-297 (2002), to produce partial or complete solutions to this problem, which can be used to create partial or complete embeddings.

Before describing the reduction, the definition of Max-Weight-Independent-Set is reviewed. That problem is defined on an undirected graph G=(V, E) (not to be confused with a schema graph) with node weights w[v], v∈V. The goal is to find a subset V' of V such that for $v_i$ and $v_j$ in V', there is no edge from $v_i$ to $v_j$. In other words, $(v_i, v_j) \notin E$ and the weight of V', defined as $\Sigma_{v \in V'} w[v]$, is maximized.

Given an instance of the assemble-embedding problem, an instance of max-weight-independent-set can be constructed. First, for each local mapping $\sigma_a \in C(A)$ for any $A \in E_1$, a vertex $v_{\sigma_a}$ is constructed in V. Second, for each pair $\sigma_a, \sigma_b$ of such mappings, an edge between $v_{\sigma_a}$ and $v_{\sigma_b}$ is constructed if $\sigma_a$ and $\sigma_b$ conflict. The weight of $v_{\sigma_a}$ is given as qual $(\sigma_a, att)$.

To complete the algorithm on the resulting graph, an existing heuristic tool is used for Max-Weight-Independent-Set, which returns a subset V' of V. Finally, an embedding σ is constructed by adding local embedding $\sigma_a$ to σ for each $v_{\sigma_a} \in V'$. The quality of σ is warranted by the heuristic tool used, and its correctness is verified below.

If $|V'|=|E_1|$, σ constructed as above is a schema embedding from $S_1$ to $S_2$.

If σ is not a full embedding, the findPathsRand algorithm is used to generate new local mappings, if any are available, for tags A not mapped by σ, and repeating the process until either it finds a valid embedding or it reaches a threshold of tries.

Prefix-Free Paths in Cyclic Graphs

The findPathsDAG algorithm 300, discussed above in conjunction with FIG. 3, provides an algorithm for finding paths in an acyclic graph. This algorithm 300 can be generalized to handle arbitrary cyclic graphs in time polynomial in the size of the graph.

The generalized algorithm has three parts: 1) break up the original graphs into a DAG of connected components, 2) solve this problem for the DAG case, 3) add back in the connected components, and 4) use the cycles found in these components to create prefix-free paths to nodes in the component or reachable therefrom. We now describe these steps in more detail.

FIG. 7 illustrates exemplary pseudo-code for a findpahts algorithm 700. The findpahts algorithm 700 finds a set of prefix-free paths from a single root s to a bag of target nodes in a possibly cyclic graph. In step 3, the algorithm 700 computes a "component graph" of a graph G that is defined as the graph produced from G by replacing each cyclic connected component in G with a new node, $c_i$ and creating edges to and from $c_i$ for each edge which entered or left component i in the original graph. Note that the resulting graph is a directed graph containing component nodes $c_i$ as well as any node in G that did not participate in a cycle.

A node n∈V is said to be in the shadow of $c_i$ if n can be reached in G by a node in $c_i$. The target shadow of $c_i$ is the subset of $L_{tar}$ in the shadow of $c_i$. Note that a target node may be in the shadow of more than one component node. To continue with the discussion of the findpahts algorithm 700, the algorithm 700 at line 4-5 removes cyclic components and all nodes reachable from them from the component graph. For each cyclic node that contains a target node or from which a target node is reachable, a node for that component is added back to the graph as a new target node (along with nonredundant edges from nodes in $c_i$). The idea is that the computed path to this node will be used as the prefix for all paths in that component or reachable therefrom. A bag $L'_{tar}$ is computed from $L_{tar}$ by removing any target nodes no longer in the graph and adding any of the just-mentioned component nodes. Finally, for each component node $c_i$ with a non-empty target cycle, a new target set $L'_{tar}$ is created with target nodes, if any, in the shadow of $c_i$, and a findpathCycle algorithm 800, shown in FIG. 8, is called to construct paths to these targets.

FIG. 8 illustrates exemplary pseudo-code for the findpathCycle algorithm 800. Generally, the findpathCycle algorithm 800 considers a path consisting of the nodes in a cycle, say $y_1, \ldots, y_n, y_1$, followed by three nodes a, b, c. Prefix free paths to a, b, and c are constructed by creating an arbitrary number of paths to each node by going around some number of times. If paths to b and c are formed, say $P_b$ and $P_c$, it is easy to see that the prefix-free property will only hold if there are more instances of the y cycle in the path to $P_b$ than that to $P_c$.

In the algorithm 800, at line 2, a cycle, Y, is identified containing at least one node from $L_{tar} \cap C_i$, if such nodes exist. This cycle is used to provide non-prefix paths for each target node not in the shadow of $c_i$ but not in $c_i$ itself. In line 5, the notation "count trips around Y" means that the nodes of the cycle, starting with the last node in ρ, are added to the path, in order, then this is repeated "count" times. This is repeated for the case that $c_i$ is complex, and some target nodes remain in $c_i$ but not in the first Y chosen. Alternatively, a cycle could be found containing all the nodes from $L_{tar} \cap c_i$ at line 1, but the paths produced would be even longer than the ones produced by the current algorithm. Finally, a search cannot be done for a simple (Hamiltonian) cycle with all the $L_{tar}$ nodes in polynomial time.

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

We claim:

1. A method for mapping one or more source schemas to at least one target schema, comprising:
    obtaining said one or more source schemas; and
    mapping one or more edges in said one or more source schemas to one or more paths in said at least one target schema, wherein said mapping does not violate one or more prefix-free conditions and one or more path-type conditions, wherein said one or more prefix-free conditions require that for any two edges (A, B) and (A, B') in said one or more source schemas, the path (A,B) in said one or more source schemas is not a prefix of the path (A,B) in said at least one target schema and said one or more path-type conditions requires that each edge and a corresponding path to each edge in said one or more source schemas have a same type.

2. The method of claim 1, wherein a distinctness of paths in said target schema mapped from sibling edges in said source schema allow information from said source schema to be preserved.

3. The method of claim 1, further comprising the step of mapping at least one node in said one or more source schemas to at least one node in said at least one target schema.

4. The method of claim 1, wherein one or more source documents each conforming to one of said source schemas are recovered from one or more target documents each conforming to said at least one target schema, if a mapping exists between said source schema and said target schema.

5. The method of claim 1, wherein queries on one or more source documents each conforming to one of said source schemas in a given query language are answered on one or more target documents each conforming to said at least one target schema.

6. The method of claim 5, further comprising the step of translating a reference to an edge in said one or more source schemas to a reference to a path in said one or more target schemas.

7. The method of claim 1, further comprising the step of finding one or more local embeddings for individual productions in said one or more source schemas and combining them to form a consistent embedding.

8. The method of claim 7, wherein said local embeddings are assembled into a schema embedding using a random order of said local embeddings.

9. The method of claim 7, wherein said local embeddings are assembled into a schema embedding using a quality-specific order of said local embeddings.

10. The method of claim 7, further comprising the steps of generating a candidate pool of local embeddings and employing a heuristic solution to Maximum-Independent-Set to assemble a valid schema embedding.

11. The method of claim 7, wherein said local embeddings are assembled into a schema embedding and wherein said method further comprises the step of generating one or more non-conflicting local embeddings when a conflict is detected.

12. The method of claim 1, wherein said mapping step generates a schema embedding, $\sigma$, that is a pair of functions ($\lambda$, path) that maps each element type, A, in a collection of labels, $E_1$, from a source schema, $S_1$, to a corresponding $\lambda(A)$ type in a collection of labels, $E_2$, from a target schema, $S_2$, for said type mapping, $\lambda$, and each edge (A, B) in $S_1$ to a unique path (A,B) from $\lambda(A)$ to $\lambda(B)$ in $S_2$.

13. The method of claim 1, wherein said mapping is based on a similarity metric, att (A,B), that indicates the suitability of mapping each element type A in a source schema to each element type B in a target schema.

14. A method for identifying one or more prefix-free paths in a directed acyclic graph (DAG) structure, comprising:
    performing a depth-first-search on an input graph such that for each edge connecting to a source node (s) one or more paths are identified to target nodes in a set of target vertices, ($L_{tar}$); and
    identifying prefix-free paths among said identified paths, wherein said prefix-free paths require that for any two edges (A, B) and (A, B') in one or more source schemas, the path (A,B) in said one or more source schemas is not a prefix of the path (A,B) in at least one target schema.

15. The method of claim 14, further comprising the step of maintaining an array to monitor whether a subgraph rooted at a node (n) has been searched and yielded no matches for nodes in ($L_{tar}$).

16. An apparatus for mapping one or more source schemas to one or more target schemas, the apparatus comprising:
    a memory; and
    at least one processor, coupled to the memory, operative to:
    obtain said one or more source schemas; and
    map one or more edges in said one or more source schemas to one or more paths in said one or more target schemas, wherein said mapping does not violate one or more prefix-free conditions and one or more path-type conditions, wherein said one or more prefix-free conditions require that for any two edges (A, B) and (A, B') in said one or more source schemas, the path (A,B) in said one or more source schemas is not a prefix of the path (A,B) in said at least one target schema and said one or more path-type conditions requires that each edge and a corresponding path to each edge in said one or more source schemas have a same type.

17. The apparatus of claim 16, wherein a distinctness of paths in said target schema mapped from sibling edges in said source schema allow information from said source schema to be preserved.

18. The apparatus of claim 16, wherein one or more source documents each conforming to one of said source schemas are recovered from one or more target documents conforming to said at least one target schema, if a mapping exists between said source schema and said target schema.

19. The apparatus of claim 16, wherein queries on one or more source documents each conforming to one or more of said source schemas in a given query language are answered on one or more target documents conforming to said at least one target schema.

20. The apparatus of claim 16, further comprising the step of finding one or more local embeddings for individual productions in said one or more source schemas and combining them to form a consistent embedding.

21. The apparatus of claim 20, wherein said local embeddings are assembled into a schema embedding using a random order of said local embeddings.

22. The apparatus of claim 20, wherein said local embeddings are assembled into a schema embedding using a quality-specific order of said local embeddings.

23. The apparatus of claim 20, further comprising the steps of generating a candidate pool of local embeddings and employing a heuristic solution to Maximum-Independent-Set to assemble a valid schema embedding.

* * * * *